May 14, 1929.   T. K. STEVENSON   1,713,103
ANTIFRICTION BEARING PULLER
Filed Nov. 13, 1926
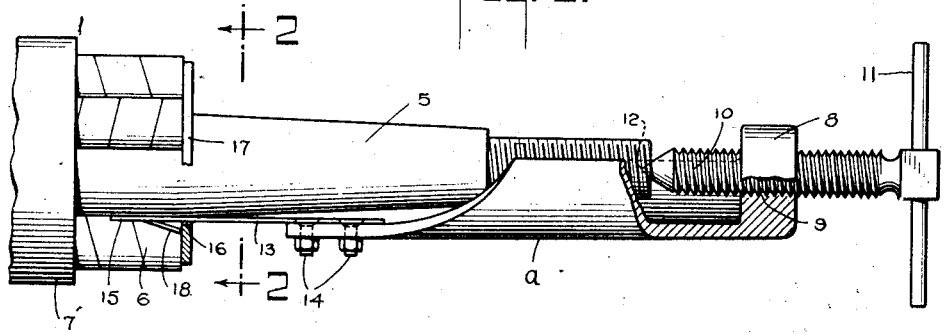
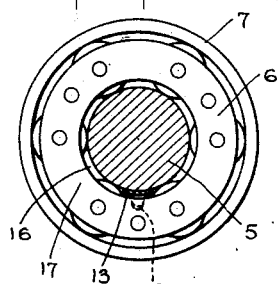
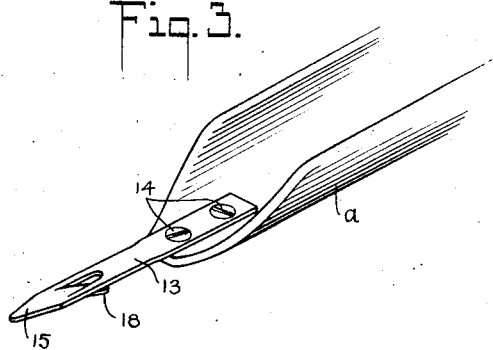
INVENTOR
Thomas K Stevenson
BY
Cavanaugh & James
ATTORNEYS.

Patented May 14, 1929.

1,713,103

UNITED STATES PATENT OFFICE.

THOMAS K. STEVENSON, OF NEW YORK, N. Y., ASSIGNOR TO FRANCIS VAN BLARCOM, OF NEW YORK, N. Y.

ANTIFRICTION BEARING PULLER.

Application filed November 13, 1926. Serial No. 148,238.

The present invention relates to tools and has particularly reference to tools usable as accessories in removing parts of machinery for examination or repair. In general the tool has to do with the removal of machinery parts which are frictionally held in position to surround other machinery parts, a familiar example being a shaft and an anti-friction bearing therefor. In this connection and where anti-friction bearings of the roller bearing type are used for the rear axles of motor vehicles instances exist where, because of the construction of the roller bearing retainers, a long and difficult operation is required in order to remove one or more of the roller bearings.

A known example of this construction is found to exist in the rear axle bearings of the Ford motor vehicle, and it is occasioned by the frictional bind of the retainer upon the cage of the bearing.

In any instance wherein the removal of a roller bearing is involved, there is considerable likelihood of imparting permanent damage to the cage of the bearing if the frictional bind thereon by the retainer is nonresponsive to a manual pull applied to the cage.

Coming now to the present invention an object thereof, is to provide for the easy and expeditious pulling of a roller bearing from its retainer and this without danger of doing damage to the bearing.

The above and other objects are accomplished by instrumentalities pointed out in the following specification.

The invention is clearly defined in the claims.

A satisfactory embodiment of the invention is illustrated in the accompanying drawings forming part of the specification and in which Fig. 1 is a perspective view of the invention in use, parts being broken away to disclose the construction and relation of other parts, Fig. 2 is a detail cross section on line 2—2 of Fig. 1, Fig. 3 is an enlarged detail perspective of the engaging end portion of the tool.

In carrying out the invention use is made of a saddle $a$ which is cast or otherwise formed of metal to provide an integral structure. The inner face of saddle $a$ is curved transversely throughout to conform to the transverse curvature of shaft or axle 5, around a portion of which is disposed roller bearing 6 frictionally held within retainer 7. An end of saddle $a$ is formed with an overhang 8 and the radius of the curved inner face of saddle $a$ is substantially the same as that of shaft or axle 5, so that when saddle $a$ is disposed longitudinally of shaft or axle 5 the overhang 8 extends over the outer end of the said shaft or axle and an axially disposed screw threaded opening 9 formed in said overhang is thereby disposed in axial alinement with shaft or axle 5. A screw 10 is screwed into opening 9. The outer end of the screw is provided with an operating handle 11, and the inner end thereof is tapered to a point 12 which permits easy rotation of the screw when the same impinges upon the end surface of shaft or axle 5. The end portion of saddle $a$ remote from overhang 8 is adapted for engaging a suitable portion of roller bearing 6.

In the present instance and for purposes of illustration a relatively thin narrow and somewhat flattened steel blade 13 is disposed with one end portion rigidly secured with screws 14 or their equivalents to the inner curved face of saddle $a$, the opposite end portion of the said blade extending coextensively with and beyond the adjacent end of the saddle and terminating in a tapered end portion 15. As constructed the blade is readily insertable into the space 16 between the shaft or axle 5, and the outer end portion of the cage 17 of the roller bearing 6 when the saddle $a$ is disposed longitudinally of the shaft or axle 5, as shown in Fig. 1. A spur or finger 18 is upstruck from the free end portion of the blade 13 and is disposed medially of the blade with its free end extending toward saddle $a$.

As shown, the spur or finger inclines outwardly from the outer face of blade 13, so that during the insertion of the extending free end portion of the blade into space 16, finger 18 underrides the outer end of cage 17 and is depressed thereby until the free end moves inwardly and beyond the outer end of the cage whereupon the finger, due to its own resiliency, moves outwardly and engages the inner face of the ring forming the outer end 17 of cage 6.

In manipulating the device to arrange the saddle upon the axle and insert blade 13 into space 16 screw 10 is given a sufficient number of turns in one direction to provide a clearance upon the inner curved face of the saddle for shaft or axle 5. After spur or finger 18 engages behind the outer end 17 of cage 6, screw 10 is then turned in the opposite direction until the pointed end portion 12 of the screw impinges upon the free end of the shaft or axle 5. The turning of the screw is then continued in the direction last referred to, whereupon saddle 5 and blade 13 move outwardly with respect to the shaft or axle and operate to pull roller bearing 6 from retainer 7.

It is to be noted that the point of engagement between the blade and roller bearing is located as close as possible to the axis of the roller bearing, so that the pull upon the bearing is practically evenly distributed throughout the same.

This construction reduces any tendency that might otherwise exist on the part of the cage to bend and become permanently damaged during the removal of the bearing.

Although I have shown and described one embodiment of my invention, it is to be understood that the same is susceptible of various changes, and I reserve the right to employ such of these as may come within the scope of the appended claims.

What I claim is:

1. A tool having interfitting screw threaded members one of which is adapted to engage the outer end portion of an antifriction bearing frictionally secured about a shaft or axle said member having a portion adapted to embrace the shaft or axle disposed beyond the bearing and having another portion formed relatively thin and flat and insertable into the space between the cage of the bearing and the shaft, the last named of said portions having a resilient lateral extension adapted to be flexed in one direction and underride the outer portion of the cage during insertion of the said portion and then move in an opposite direction and engage behind the outer end portion of the cage, the other of said members being adapted to impinge and rotate upon the free end of the shaft or axle surrounded by the bearing and operating when manipulated to turn in one direction to move the first named member and the bearing engaged thereby outwardly and longitudinally of the shaft or axle.

2. A tool for pulling an anti-friction bearing disposed around a shaft and frictionally held within a surrounding retainer, comprising a finger adapted for engaging the cage of the bearing by being insertable between the cage and the shaft and provided with a resilient lateral extension which engages behind the outer end portion of the cage, a saddle fixedly secured to the finger and having a portion adapted to extend over one end of the shaft, and means carried by the saddle and cooperable with the shaft to move the saddle and finger longitudinally of the shaft whereby the bearing is pulled outwardly from the retainer.

Signed at New York city, in the county of New York and State of New York this 26th day of October A. D. 1926.

THOMAS K. STEVENSON